(12) United States Patent
Hudson

(10) Patent No.: US 8,690,104 B2
(45) Date of Patent: Apr. 8, 2014

(54) CAPSULE SPACECRAFT EMERGENCY LANDING SYSTEM

(75) Inventor: Gary C. Hudson, Redwood City, CA (US)

(73) Assignee: HMX, Inc., Reno, NV (US)

( * ) Notice: Subject to any disclaimer, the term of this patent is extended or adjusted under 35 U.S.C. 154(b) by 252 days.

(21) Appl. No.: 13/323,699

(22) Filed: Dec. 12, 2011

(65) Prior Publication Data

US 2012/0175465 A1   Jul. 12, 2012

Related U.S. Application Data

(60) Provisional application No. 61/422,634, filed on Dec. 13, 2010.

(51) Int. Cl.
*B64D 25/12* (2006.01)
(52) U.S. Cl.
USPC ...... 244/140; 244/142; 244/158.1; 244/172.1
(58) Field of Classification Search
USPC .......... 244/158.1, 158.4–158.7, 158.9, 159.1, 244/164, 171.1, 171.7, 171.9, 172.1, 140, 244/142, 146
See application file for complete search history.

(56) References Cited

U.S. PATENT DOCUMENTS

| | | | | |
|---|---|---|---|---|
| 3,079,113 A | * | 2/1963 | Meyer, Jr. ..................... | 244/140 |
| 3,484,826 A | * | 12/1969 | McCarthy, Jr. ............ | 244/159.1 |
| 5,064,151 A | * | 11/1991 | Cerimele et al. ........... | 244/172.1 |
| 5,265,829 A | * | 11/1993 | Roberts ...................... | 244/159.1 |
| 6,299,104 B1 | * | 10/2001 | El-Sherif et al. .............. | 244/142 |

* cited by examiner

*Primary Examiner* — Timothy D Collins
*Assistant Examiner* — Jamie S Stehle
(74) *Attorney, Agent, or Firm* — Stiennon & Stiennon

(57) ABSTRACT

A method of landing a capsule-spacecraft having a crew compartment containing crew, light cargo, and whatever other elements are associated with crew safety and comfort during emergency recovery, such as survival equipment and a service component including any propulsion components, heat shield, heavier structure, or other equipment not directly connected with the crew component. In the event of a propulsion system failure, the crew compartment component is immediately separated from the service component, either by automatic or crew action. One or more parachutes are then deployed by rapid methods, such as rocket extraction, from the crew compartment. Because the space craft is separated into two parts the weight of the parachutes is reduced in proportion as the weight of the crew compartment is to the total capsule-spacecraft.

5 Claims, 1 Drawing Sheet

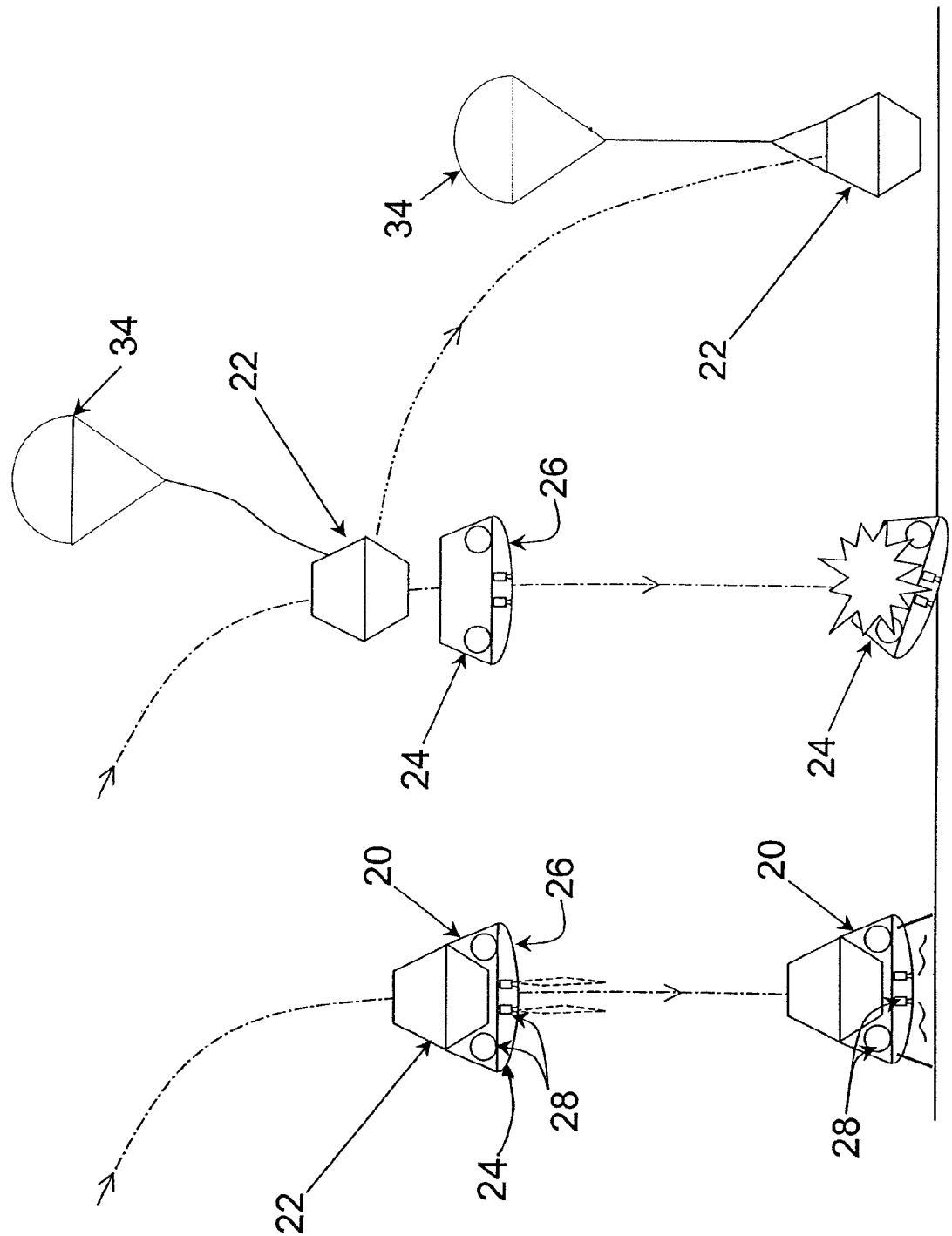

CAPSULE SPACECRAFT EMERGENCY LANDING SYSTEM

CROSS REFERENCES TO RELATED APPLICATIONS

This application claims the benefit of U.S. provisional App. No. 61/422,634 filed Dec. 13, 2010, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

Recovery of a human or cargo carrying capsule-spacecraft at the termination of a flight, whether a planned or emergency termination, may be effected by the use of drag devices such as parachutes, or by jet or rocket propulsion. Recovery systems typically mass between 10% and 25% of the recovered weight, so it is always desirable to minimize recovery system weight in order to maximize the effective payload of the capsule-spacecraft.

In the case of planed termination of a flight there are issues of deployment reliability after possible long-term space storage, uncontrolled drift from winds at the landing area, and cost of parachutes, whether replacement for a following flight, or refurbishment for reuse.

Rocket or jet propulsion has the ability to more precisely reduce the terminal velocity of a capsule-spacecraft, and very precisely control landing orientation and location, but is potentially heavy and requires the storage and use of volatile propellants, which present hazard or risk of the life of any crew.

While a landing rocket or jet system would confer the advantage of being able to precisely recover a capsule-spacecraft without risk of landing damage from water immersion in the case of a water landing, or physical or shock damage in the case of a land landing, nevertheless the risk of a failure of the jet or rocket based landing system is always present.

The primary risk is failure of the rocket or jet propulsion to function properly. A principal concern is that for optimum efficiency in the use of propellant, braking via jet or rocket propulsion should be undertaken when the spacecraft capsule is less than approximately 10-20 seconds from impact with the ground. This means there is little time to employ any other escape provision.

The usual suggestion for a backup escape system is the addition of one or more parachutes. Parachute(s) may be quickly deployed by rocket extraction methods or by mortars, but still require a few seconds to inflate and provide their optimal design-point drag reduction properties, see NASA TN D-5619 which is incorporated herein by reference. A key problem in the addition of parachutes to a vertical landing rocket or jet propulsion braking capsule-spacecraft is the inescapable fact that the weight of the capsule-spacecraft must be incremented by the weight of the parachute system, even though the capsule-spacecraft already is carrying the weight of the rocket landing system. Since weight is always at a premium for space missions, the penalty for carrying two complete and separate recovery systems is a serious operational and commercial disadvantage. For example, using the parametric weight guidelines of 10-25% for recovery systems if the capsule-spacecraft masses 10,000 pounds, without parachutes as a backup, but including the weight of the propulsive landing system, the propulsive system mass might be as much as 2,500 pounds. If parachutes are added, and are as light as only 10% of the landed mass, the capsule-spacecraft mass will grow to 11,000 pounds (10,000 pounds plus 10%, the lowest reasonable estimate for parachute system mass). This in turn means the mass of the propulsive landing system must grow in proportion, or more practically, the mass of the rest of the capsule spacecraft (i.e., the available mass of payload) must be decremented.

The invention described herein reduces this otherwise inevitable mass penalty.

SUMMARY OF THE INVENTION

The proposed solution is to split the recovered capsule-spacecraft into two components. One component is the crew compartment containing crew, light cargo, and whatever other elements are associated with crew safety and comfort during emergency recovery, such as survival equipment. The other compartment is the rest of the capsule-spacecraft, including any propulsion components, heat shield, heavier structure, or other equipment not directly connected with the crew component. For the purposes of this application we designate the all-else component as the "service" component. Depending on the skill of the designer, the crew compartment might weigh as little as one-third to one-quarter the mass of the total capsule spacecraft.

In the event of a propulsion system failure, from whatever cause, the crew compartment component is immediately separated from the service component, either by automatic or crew action. One or more parachutes are then deployed by rapid methods, such as rocket extraction, from the crew compartment. It is apparent that the mass of the crew compartment is significantly less than the total original mass of both the crew compartment and service component joined together, so the benefit of the invention is that the weight of the parachute system, used only in an emergency, will be proportionally less when used to recover only the crew compartment and not the entire unitary capsule-spacecraft. If the crew compartment masses one-third of the total capsule-spacecraft mass, then the weight savings in parachute mass might be about 700 pounds in the example above.

A further advantage of the invention is that the service component, containing potentially hazardous propellants that can cause blast or fire, will fall more or less directly to the ground beneath it, in the event of propulsion system failure, while the parachute and crew compartment assembly will drift some distance away. This approach will enhance crew safety and should not result in hazard to ground personnel since the landing area will have been cleared of personnel prior to commencement of the landing operation. The service component will impact the ground at approximately its original terminal velocity at the start of the planned recovery maneuver. This will generally result in destruction of the service component. However, once separated from the crew compartment, there is no reason why an automated flight control system on board the service component might not be commanded to continue to attempt to effect the previously planned powered landing in an attempt to recover the service component intact. Since the crew will have already been moved to safety, there is nothing to be lost by attempting such a contingency operation.

It will be apparent to one skilled in the art that the parachute system can be deployed before the command is given to separate components, for example as part of a system landing in the fashion of the Russian Soyuz that employs a single parachute plus terminal braking rockets, at the time of the command to separate components, or after the time of component separation, depending on the preference of the capsule-spacecraft designer, operator or crew and variables such as altitude and airspeed. Any of a number of methods may be used to separate the components, including explosive or non-explosive separation systems involving separating bolts, nuts, or bands or other structural attachment methods, including linear shaped explosive and pneumatic systems.

Further objects, features and advantages of the invention will be apparent from the following detailed description when taken in conjunction with the accompanying drawings.

BRIEF DESCRIPTION OF THE DRAWINGS

FIG. 1 is a schematic view of a normal landing of the capsule-spacecraft of this invention.

FIG. 2 is a schematic view of the separation of a crew capsule from the capsule-spacecraft of FIG. 1 an emergency landing of the crew capsule.

DESCRIPTION OF THE PREFERRED EMBODIMENTS

Referring more particularly to FIGS. 1-2 wherein like numbers refer to similar parts a capsule-spacecraft 20 composed of a crew compartment 22 and the service components 24. The service components contain the capsule-spacecraft heat shield 26 for atmospheric reentry, landing propulsion system 28, landing gear 30 and the majority of the structure 32 of the capsule-spacecraft 20. The capsule-spacecraft 20 is designed such that the crew compartment comprises about one third or less preferably one fourth or less of the total weight of the capsule-spacecraft 20. The crew compartment preferably has a rapid deployment parachute 34 such as a parachute deployed by a mortar or rocket extraction. If timing is not as critical a drogue chute which is lighter can be used for example if the parachute is deployment as part of the normal land procedure followed by a rocket or jet landing. Such a system reduces the weight of the landing rocket or jet system by reducing the terminal velocity which must be counteracted by a rocket or jet system. Such a system is used by the Russian Soyuz that deploys a single parachute plus terminal braking rockets just before touchdown. In the capsule-spacecraft 20 such a system of deploying a parachute of such a size as to provide emergency landing for the crew capsule alone, but otherwise in a normal landing using rockets or jet helping to reduce the weight of the of the landing rocket or jet system.

Using the maximum acceleration has about 50 times acceleration of gravity (g) or about 1600 ft/sec$^2$, and about a 1.5 feet of crushable structure beneath the human crew the parachute landing system for the crew capsule could be sized for example to provide a 69 ft./s descent rate, which would imply a descent rate for the capsule-spacecraft with the same parachute of 97-138 ft/sec$^2$ for crew capsule wt of 50% to 25% respectively.

The design of a capsule-spacecraft and its landing systems is according to the following equations wherein the:

$$tvcc=\sqrt{2LRa} \times SF,$$

and $$tvcs=\sqrt{1/CW} \times SF$$

a=max acceleration typically in the range of 20 to 75 g.
LR=load relieving terminal braking system such as crushable structure
WCS=weight of capsule-spacecraft
WCC=weight of crew capsule
tvcc=terminal velocity of crew capsule for which the parachute is sized
tvcs=terminal velocity capsule-spacecraft with crew capsule parachute
SF=safety factor of 1.0 to 2.0
CW=percent of capsule-spacecraft weight which equals the weight of the crew It should be understood that the crew capsule parachute can be deployed by any method including spring, mortar, tractor-rocket initiated drogue, or main chute deployment by mortar, ballistic, or tractor rocket(s).

It should be understood that a safety factor will normally be applied to the parachute terminal velocities of 1.2 to 1.4. Likewise safety factor of 1.2 to 1.4 will normally be applied to the acceleration attenuation system, it being understood that the safety factor can have a range of 1.0 to 2.0.

It is understood that the invention is not limited to the particular construction and arrangement of parts herein illustrated and described, but embraces all such modified forms thereof as come within the scope of the following claims.

It should be understood that the inventions include a method for reducing the weight of the backup parachute landing system of a capsule-spacecraft by the steps of: separating the crew compartment for separate recovery from all other service components of the capsule-spacecraft, allowing said all other service components to fall to earth or to be recovered separately, wherein the crew compartment comprises less than ½ of the weight of the capsule-spacecraft, or wherein the crew compartment comprises less than ⅓ of the weight of the capsule-spacecraft, or wherein the crew compartment comprises less than ¼ of the weight of the capsule-spacecraft.

I claim:

1. A method of landing an orbital capsule-spacecraft, having a crew capsule with crew and a service component, wherein the crew capsule and crew has a weight not more than one half of the weight of capsule-spacecraft comprising the steps of:

sizing a parachute to slow the crew capsule for an emergency/independent landing according to the equation:

$$tvcc=\sqrt{2LRa} \times SF$$

a=max acceleration between 20-75×gravitational acceleration
LR=load relieving terminal braking system
WCS=weight of capsule-spacecraft
WCC=weight of crew capsule is ≤50% of WCS
tvcc=terminal velocity of crew capsule for which the parachute is sized
tvcs=terminal velocity capsule-spacecraft with crew capsule parachute
SF=safety factor of 1.2 to 1.4
CW=percent of capsule-spacecraft weight which equals the weight of the crew
and sizing a rocket or jet landing system for the tvcs of the capsule-spacecraft according to the equation:

$$tvcs=\sqrt{1/CW} \times SF.$$

2. The method of claim 1 wherein WCC (weight of crew capsule is)≤33% of WCS.

3. The method of claim 1 wherein WCC (weight of crew capsule is) ≤25% of WCS.

4. The method of claim 1 wherein LR≤3 ft.

5. The method of claim 1 wherein LR≤1.5 ft.

* * * * *